United States Patent [19]

Sogo

[11] 4,347,756
[45] Sep. 7, 1982

[54] TRANSMISSION

[75] Inventor: Yoshitaka Sogo, Toyota, Japan

[73] Assignee: Toyota Jidosha Kogyo Kabushiki Kaisha, Toyota, Japan

[21] Appl. No.: 173,750

[22] Filed: Jul. 30, 1980

[30] Foreign Application Priority Data

Apr. 3, 1980 [JP] Japan ............................ 55/45143[U]

[51] Int. Cl.³ ...................... F16H 57/04; F16H 7/26
[52] U.S. Cl. ................................................... 74/467
[58] Field of Search ......................... 74/467; 184/6.12

[56] References Cited

U.S. PATENT DOCUMENTS

| 2,085,814 | 7/1937 | Matthews et al. | 184/6.12 |
| 3,605,946 | 9/1971 | Oehl | 184/6.12 |
| 4,018,097 | 4/1977 | Ross | 74/467 |
| 4,068,740 | 1/1978 | Quinn et al. | 74/467 |
| 4,090,748 | 5/1978 | Sugimoto et al. | 74/467 |
| 4,221,279 | 9/1980 | Jones et al. | 74/467 |
| 4,231,266 | 11/1980 | Nishikawa et al. | 74/467 |

FOREIGN PATENT DOCUMENTS 629052  9/1949  United Kingdom .............. 184/6.12

OTHER PUBLICATIONS

Nissan Maintenance Manual, pp. 126, 128, 1974.
Toyota Dyna and Coaster Repair Manual, p. 3-2, 1978.

Primary Examiner—Lawrence J. Staab
Attorney, Agent, or Firm—Cushman, Darby & Cushman

[57] ABSTRACT

A transmission comprising a housing having one and the other longitudinal end walls. The other longitudinal end wall includes an upper wall section and a lower wall section offset from the upper wall section toward the one longitudinal end wall to define a step surface between the upper and lower wall sections. A counter shaft has one and the other axial ends rotatably supported in the one longitudinal end wall and by the bearing, respectively. A chamber is formed in the lower wall section with the bearing exposed to the chamber. A passage communicates the step surface and the chamber with each other to introduce lubricating oil from the step surface into the chamber for lubricating the bearing.

7 Claims, 4 Drawing Figures

TRANSMISSION

BACKGROUND OF THE INVENTION

1. Field of the Invention

The present invention relates to a transmission, and more particularly to a manual transmission for use in vehicles.

2. Description of the Prior Art

In general, a conventional manual transmission for vehicles comprises a housing which has one and the other longitudinal end walls and has a bottom defining a reservoir for lubricating oil. The other longitudinal end wall of the housing includes an upper wall section and a lower wall section offset from the upper wall section toward the one longitudinal end wall of the housing to define a step surface between the upper and lower wall sections. An input shaft which is adapted to be connected to an output shaft of an engine of a vehicle through a clutch is rotatably supported in the one longitudinal end wall of the housing. A counter shaft extending parallel to the input shaft has one and the other axial ends which are rotatably supported in the one longitudinal end wall of the housing and by a first bearing disposed in the lower wall section of the other longitudinal end wall of the housing, respectively. The counter shaft is connected to the input shaft through an input gear mounted on the inner axial end of the input shaft and a first counter gear mounted on the counter shaft in mesh with the input gear. A chamber is formed in the lower wall section of the other longitudinal end wall of the housing with the first bearing exposed to the chamber. A second bearing is mounted around the counter gear. A second counter gear is mounted around the second bearing for rotation relative to the counter shaft and is in mesh with an output gear mounted on the output shaft.

In the conventional transmission described above, at least a portion of each of the first and second bearings is dipped in the lubricating oil within the reservoir defined at the bottom of the housing, during the half of the rotation of the input shaft. When the input shaft is rotated to cause the counter shaft to be rotated, the lubricating oil within the reservoir is scooped up by the counter gears on the counter shaft and is reduced to such a level that the substantially entire first and second bearings are exposed. During the rotation of the input shaft, the first bearing is lubricated by the lubricating oil adhered to the first bearing prior to the rotation of the input shaft, and by the lubricating oil spattered or splashed on the inner end surface of the first bearing facing the one longitudinal end wall of the housing. However, because the lubricating oil adhered to and spattered on the first bearing is small in quantity, the first bearing is not supplied with a sufficient quantity of lubricating oil, which results in the increase in temperature of the first bearing and also results in the shortness of service life thereof.

In addition, during the rotation of the input shaft, the second bearing is lubricated by the lubricating oil scooped up by the counter gears and dropped on the vicinity of the second bearing. However, because mechanical elements adjacent the second bearing are intimately fitted into and/or engaged with each other for maintaining accuracy, there are an extremely small number of paths or passages along which the lubricating oil dropped on the vicinity of the second bearing is led thereto. Therefore, during the rotation of the input shaft, the second bearing is not supplied with a sufficient quantity of lubricating oil, which results in the increase in temperature of the second bearing and also results in the shortness of service life of the second bearing.

SUMMARY OF THE INVENTION

An object of the present invention is to provide an improvement in the above-described conventional transmission, in which during the rotation of the input shaft a sufficient quantity of lubricating oil is supplied to the first bearing to enable the service life thereof to be improved.

According to the present invention, there is provided an improvement which comprises a passage for communicating the step surface between the upper and lower wall sections and the chamber with each other to introduce the lubricating oil from the step surface into the chamber for lubricating the first bearing.

The transmission may preferably comprise a second passage for communicating the chamber and the second bearing with each other, to supply the lubricating oil to the second bearing for lubricating the same.

DETAILED DESCRIPTION OF PREFERRED EMBODIMENT

Figure 1:
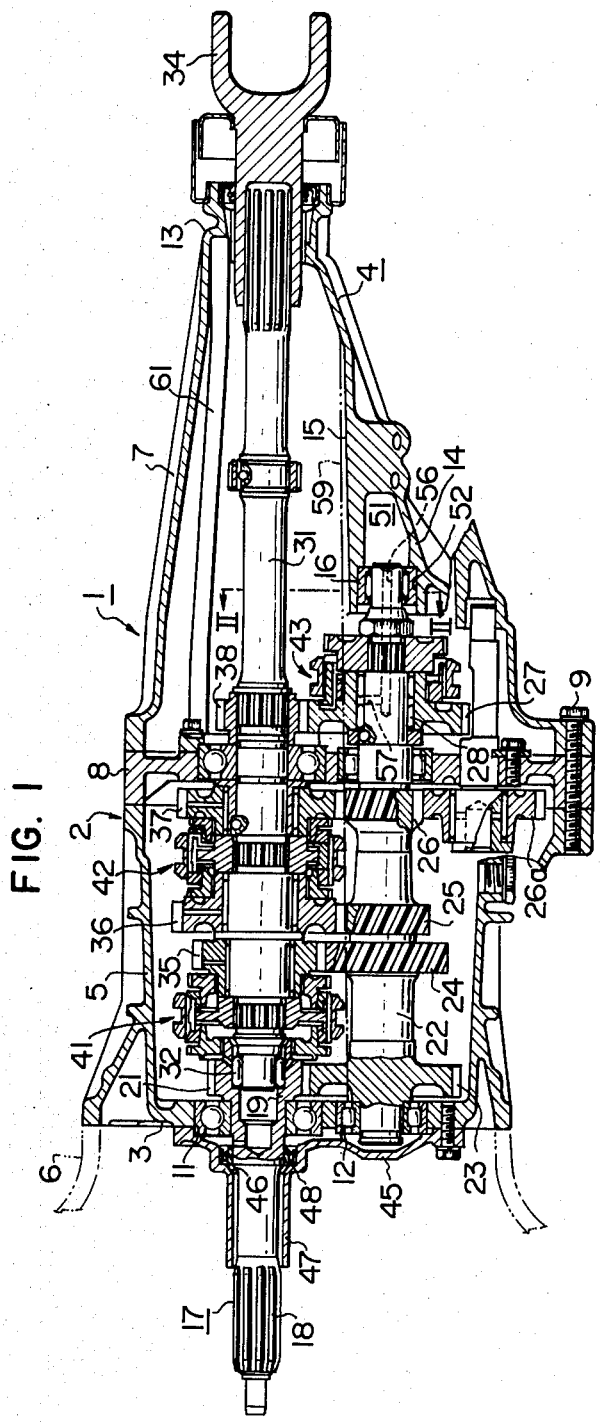
FIG. 1 is a longitudinal cross-sectional view showing a transmission according to the present invention.

Referring to FIG. 1, a manual transmission for vehicles, generally designated by 1, comprises an elongated housing 2 which includes one longitudinal end wall 3 and the other longitudinal end wall 4 and has a bottom defining a reservoir for lubricating oil. The housing 2 comprises a main housing section 5 adapted to be connected to a clutch housing 6 shown by phantom lines by means of fastening means such as bolts, and an extension housing section 7 connected to the main housing section 5 through an intermediate plate 8 for supporting bearing, by means of bolts 9.

A ball bearing 11 and a roller bearing 12 are disposed in upper and lower sections of the one longitudinal end wall 3 of the housing 2, respectively. The other longitudinal end wall 4 includes an upper wall section 13 and a lower wall section 14 which is offset from the upper wall section 13 toward the one longitudinal end wall 3 of the housing to define a step surface 15 between the upper and lower wall sections 13 and 14. A roller bearing 16 is disposed in the lower wall section 14 of the other longitudinal wall 4 and is axially aligned with the roller bearing 12.

An input shaft 17 is rotatably supported by the ball bearing 11 and has one axial end 18 adapted to be connected to a not-shown output shaft or a not-shown engine through a not-shown clutch and the other axial end 19 extending into the housing 2. An input gear 21 is integrally formed on the other axial end 19 of the input shaft 17. A counter shaft 22 extends parallel to the input shaft 17 and its axially aligned ends thereof rotatably supported by the bearings 12 and 16, respectively. The counter shaft 22 has formed integrally therewith a third, second, first and reverse counter gears 23, 24, 25 and 26 from the left in FIG. 1. The third counter gear 23 is in mesh with the input gear 21. A fourth or over-top counter gear 27 is mounted on the counter shaft 22 through a roller bearing 28 for rotation relative to the counter shaft.

An output shaft 31 has one axial end thereof which is rotatably fitted through a bearing 32 into a bore in the other axial end 19 of the input shaft 17, and the other axial end which is rotatably supported in the other longitudinal end wall 4 of the housing 2 through a sleeve yoke 34 and is adapted to be connected to a not-shown propeller shaft. A second output gear 35 in mesh with the second counter gear 24, a first output gear 36 in mesh with the first counter gear 25 and a reverse output gear 37 in mesh with the reverse counter gear 26 are mounted on the output shaft 31 through respective bearings for rotation relative to the output shaft 31. A fourth or over-top output gear 38 is in mesh with the fourth counter gear 27 and is mounted on the output shaft 31 for rotation therewith.

Synchronizers 41, 42 and 43 are disposed between the input gear 21 and the second output gear 35, between the first output gear 36 and the reverse output gear 37, and between the fourth counter gear 27 and the counter shaft 22, respectively. Such synchronizers are known per se and form no part of the present invention. Detailed descriptions of the synchronizers will be omitted.

A bearing retainer 45 is attached to an outer surface of the one longitudinal end wall 3 of the housing 2 to retain the bearings 11 and 12 in their axial positions. The bearing retainer 45 includes an opening 46 through which the input shaft 17 extends and a tubular extension 47 projecting away from the opening to surround the input shaft 17. A ring-seal member 48 made of a resilient material such as rubber is disposed between the opening 46 and the input shaft 17 to seal an annular clearance therebetween.

A lubricating oil-chamber 51 is formed in the lower wall section 14 of the other longitudinal end wall 4 of the housing and is in contact with an end surface (a right end surface in FIG. 1) of the bearing 16 remote from the one longitudinal end wall 3 of the housing. The bearing 16 is intimately fitted into a bore 52 formed in the lower wall section 14. The bore 52 has one end thereof opening into the end surface of the lower wall section 14 and the other end connected to the chamber 51.

Figure 2:
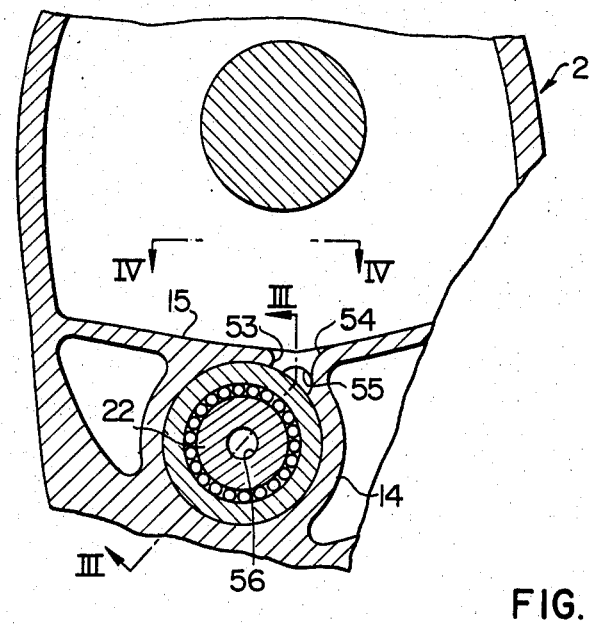
FIG. 2 is a cross-sectional view taken along a line II—II of FIG. 1.
Figure 4:
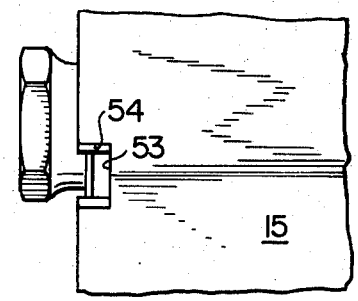
FIG. 4 is a plan view as viewed from the direction of a line IV—IV of FIG. 2.
Figure 3:
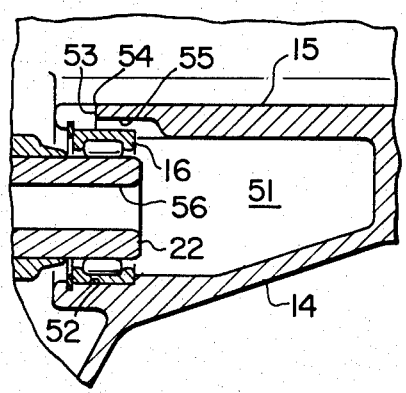
FIG. 3 is a cross-sectional view taken along a line III—III of FIG. 2.

As shown in FIGS. 2-4, a groove 53 is formed in the wall between the wall surface of the bore 52 and the step surface 15 and has an open one end 54 opening into the step surface 15 and the other open end opening into the wall surface of the bore 52. An axially extending groove 55 is formed in a portion of the wall surface of the bore 52 and in a portion of the wall surface of the chamber 51, and has one end connected to the groove 53 and the other end connected to the chamber 51. Thus, the chamber 51 communicates with the step surface 15 through the grooves 53 and 55.

As shown in FIG. 2, the step surface 15 has a V-shaped cross-section in a plane perpendicular to the longitudinal axis of the housing 2, and the bottom of the V-shape is positioned at the center of the open one end 54 of the groove 53. Thus, the step surface 15 is inclined downwardly from the wall surface of the housing 2 toward the open one end 54 of the groove 53.

An axial bore 56 is formed in the counter shaft 22 in a concentric relation thereto one open end opening into the axial end face of the counter shaft 22. As shown in FIG. 1, a radial bore 57 is formed in the counter shaft 22 and has one end opening into the outer circumferential surface of a portion of the counter shaft 22 around which the bearing 28 is mounted and the other end connected to the other end of the axial bore 56. Thus, the bearing 28 communicates with the chamber 51 through the radial bore 57 and the axial bore 56.

When the clutch between the output shaft of the engine and the input shaft 17 is released and an operator moves a not-shown shift lever to a first or low position, the synchronizer 42 is moved from its neutral position to directly connect the first output gear 36 to the output shaft 31. Then, when the clutch is energized, the rotation of the output shaft of the engine is transmitted through the clutch to the input shaft 17 to cause the input gear 21 to be rotated. The rotation of the input gear 21 is transmitted to the output shaft 31 through the third counter gear 23, the counter shaft 22, the first counter gear 25 and the first output gear 36. When the shift lever is moved to a second position, the synchronizer 42 releases the direct connection between the first output gear 36 and the output shaft 31 and is returned to the neutral position. The synchronizer 41 is moved from its neutral position to directly connect the second output gear 35 to the output shaft 31, so that the rotation of the input gear 21 is transmitted to the output shaft 31 through the third counter gear 23, the counter shaft 22, the second counter gear 24 and the second output gear 35. When the shaft lever is moved to a third position, the synchronizer 41 releases the direct connection between the second output gear 35 and the output gear 31 and directly connects the third output gear or input gear 21 to the output shaft 31, so that the rotation of the input gear is directly transmitted to the output shaft 31. When the shift lever is moved to a fourth position, the synchronizer 41 releases the direct connection between the input gear 21 and the output shaft 31 and is returned to the neutral position. Whereupon, the synchronizer 43 is moved from its neutral position to connect the fourth counter gear 27 to the counter shaft 22. The rotation of the input gear 21 is transmitted to the output shaft 31 through the third counter gear 23, the counter shaft 22, the fourth counter gear 27 and the fourth output gear 38. In addition, when the shaft lever is moved to a reverse position, the synchronizer 42 directly connects the reverse output gear 37 to the output shaft 31, so that the rotation of the input gear 21 is reversed and transmitted to the output shaft through the third counter gear 23, the counter shaft 22, the reverse counter gear 26, a reverse idler gear 26a and the reverse output gear 37. The reverse idler gear 26a is shown in FIG. 1 in an exploded manner for the purpose of easy reference to the disposition of the idler gear.

The lubricating oil within the reservoir defined at the bottom of the housing has a level 59 shown in a phantom line, when the transmission is installed on a vehicle. When the counter shaft 22 is rotated, the lubricating oil within the reservoir is scooped up by the counter gears 23-27 and is decreased to such a level that the substantially entire bearings 16 and 28 are exposed. A portion of the lubricating oil mainly scooped up by the fourth counter gear 27 is received by a trough 61 extending longitudinally adjacent to the top of the housing 2. The lubricating oil received by the trough 61 flows therealong and is supplied to bearing and seal member disposed in the upper wall section 13 of the other longitudinal end wall 4 of the housing, for rotatably supporting the output shaft 31. The lubricating oil which has lubricated the bearing and seal member in the upper wall section 13 flows along the step surface 15 by gravity toward the end surface of the lower wall section 14. The remaining portion of the lubricating oil mainly scooped up by the counter gear 27 is dropped on the step surface 15 and flows therealong.

The lubricating oil flowing along the step surface 15 after lubricating the bearing and seal member disposed in the upper wall section 13 and the lubricating oil directly dropped on the step surface 15 flow toward the open end 54 of the groove 53, because of the V-shape of the step surface 15, and enter the chamber 51 through the groove 53 opening 54 and the axial groove 55. The lubricating oil flowing into the chamber 51 is supplied to the bearing 16 to lubricate the same. In addition, the lubricating oil flowing into the chamber 51 is supplied through the axial bore 56 and the radial bore 57 to the bearing 28 to lubricate the same.

As described above, in the transmission according to the present invention, during the rotation of the input shaft 17 and the counter shaft 22, the lubricating oil within the reservoir defined at the bottom of the housing is scooped up mainly by the counter gear 27 and is received by the step surface 15. The lubricating oil received by the step surface 15 is introduced into the chamber 51 through the grooves 53 and 55 and is supplied to the bearing 16. The lubricating oil introduced into the chamber 51 is supplied to the bearing 28 through the axial and radial bores 56 and 57. Thus, even if the lubricating oil within the reservoir defined at the bottom of the housing is scooped up so that the substantially entire bearings 16 and 28 are exposed during the rotation of the input shaft 17, a sufficient quantity of lubricating oil is supplied to these bearings to restrain the increase in temperature of the bearings, thereby to enable the service life of the bearings to be prolonged.

What we claim is:

1. A transmission including an outer housing having a main portion and an elongated portion extending therefrom, input shaft means rotatably connected to said main portion for connecting the transmission to a source of power, output shaft means rotatably secured in said housing for transmitting output torque from an engine, counter shaft means rotatably secured in said housing for drivingly connecting said input shaft means to said output shaft means, said counter shaft means having one end rotatably mounted in at least first bearing means positioned in said elongated portion, said elongated portion having upper and lower sections, said upper section including first trough means for collecting oil transported by said output and counter shaft means and for directing that oil to said lower section, said lower section comprising a second trough means extending at least in part beneath said first trough means so as to collect oil flowing therefrom, said second trough means having an inclined V-shaped upper surface terminating at means defining an opening positioned above said first bearing means, means defining a chamber beneath said second trough means within said lower section in which said first bearing means and one end of said counter shaft means are exposed, said second trough means further including means defining a passageway undercut beneath said V-shaped upper surface leading away from said opening between said first bearing means and said second trough means into said chamber.

2. A transmission as in claim 1 wherein said V-shaped upper surface lies in a plane perpendicular to the longitudinal axis of said housing.

3. A transmission as defined in claim 1 further comprising second bearing means disposed around a portion of said counter shaft means between the ends thereof, and means defining a second passage extending within said counter shaft means for communicating said second bearing means and said chamber with each other to introduce lubricating oil from said chamber to said second bearing.

4. A transmission claimed in claim 3, wherein said second passage includes an axial bore formed in said counter shaft means and having one end opening into said chamber and a radial bore formed in said counter shaft means and having one end opening at said second bearing means and the other end connected to the other end of said axial bore.

5. A transmission comprising:
a housing including one longitudinal end wall and another longitudinal end wall and a bottom defining a reservoir for lubricating oil,
the other longitudinal end wall of said housing including an upper wall section and a lower wall section offset from said upper wall section toward the one longitudinal end wall of said housing to define a step surface between said upper and lower wall sections,
said transmission including an input shaft rotatably mounted to said housing and having a first gear thereon, an output shaft rotatably mounted to said housing and having a second gear thereon, a counter shaft rotatably mounted within said housing and having third and fourth gears thereon, said input shaft being operatively connected to said output shaft through said counter shaft with said first and second gears being respectively operatively engaged with said third and fourth gears, said counter shaft having at least one bearing means, at least a portion of each of said third and fourth gears and said at least one bearing means being within oil contained within said reservoir so that during rotation of said counter shaft and said third and fourth gears, oil will be removed from said reservoir thereby exposing said at least one bearing,
said lower wall section and said step surface including means defining a bore into which said at least one bearing is mounted and a chamber adjacent one side of said bore, said bore being open into said chamber so as to expose the end of said counter shaft therein,
said step surface further including an end wall positioned adjacent said bore, means defining a first opening formed in the end wall of said step surface, means defining a second opening for connecting said first opening to said chamber, both said first and second openings being located adjacent said bore,
said step surface having a V-shaped cross-section in a plane perpendicular to a longitudinal axis of the housing, the bottom of said V-shape extending into said first opening so that lubricating oil will flow from the step surface, through said first and second openings and into said chamber so as to lubricate said at least one bearing mounted within said bore and the exposed end of said counter shaft.

6. A transmission as in claim 5 further including second bearing means positioned around said counter shaft between the ends thereof for rotatably supporting said counter shaft and means defining a passageway extending along a predetermined portion of said counter shaft for communicating said second bearing means with said chamber and for introducing lubricating oil to said second bearing means.

7. A transmission as in claim 5, wherein said passageway comprises an axially extending bore formed within said counter shaft, said bore having one end opening into said chamber and a radially extending bore having one end opening into said axial bore and another end opening into said second bearing means.

* * * * *